United States Patent [19]
Richert

[11] Patent Number: 5,018,864
[45] Date of Patent: May 28, 1991

[54] PRODUCT DISCRIMINATION SYSTEM AND METHOD THEREFOR

[75] Inventor: Gerald R. Richert, Three Rivers, Calif.

[73] Assignee: OMS-Optical Measuring Systems, Three Rivers, Calif.

[21] Appl. No.: 375,319

[22] Filed: Jun. 30, 1989

Related U.S. Application Data

[63] Continuation-in-part of Ser. No. 204,685, Jun. 9, 1988, abandoned.

[51] Int. Cl.[5] .......... G01B 11/02
[52] U.S. Cl. .......... 356/372; 356/385
[58] Field of Search .......... 356/372, 376, 380, 383, 356/384, 385; 250/223 R, 560; 209/586, 587; 364/562, 563

[56] References Cited

U.S. PATENT DOCUMENTS

| | | | |
|---|---|---|---|
| 3,805,065 | 4/1974 | Williams | 250/226 |
| 3,981,590 | 9/1976 | Perkins | 356/178 |
| 3,993,899 | 11/1976 | Chapman | 250/227 |
| 4,106,628 | 8/1978 | Warkentin et al. | 209/74 M |
| 4,127,773 | 11/1978 | West | 250/461 R |
| 4,150,287 | 4/1979 | Perkins | 250/226 |
| 4,204,950 | 5/1980 | Burford, Jr. | 209/558 |
| 4,281,933 | 8/1981 | Houston et al. | 356/425 |
| 4,330,062 | 5/1982 | Conway et al. | 209/582 |
| 4,371,783 | 2/1983 | Grimmell et al. | 250/227 |
| 4,454,029 | 6/1984 | Codding | 209/581 |
| 4,693,607 | 9/1987 | Conway | 356/380 |
| 4,735,323 | 4/1988 | Okada et al. | 209/582 |
| 4,825,068 | 4/1989 | Suzuki et al. | 250/223 R |

*Primary Examiner*—F. L. Evans
*Attorney, Agent, or Firm*—Lyon & Lyon

[57] ABSTRACT

A product discrimination system using a lens assembly for projecting an image of the product unit toward a randomized fiber optic cable. The end of the fiber optic cable is constructed in a rectangular section such that a long thin section of the product unit is viewed at any given time. The cable discharges the light at a lens and filter arrangement such that the emitted light may be divided into portions and filtered for measurement by photodiodes of specific and different wavelengths. Through a comparison of the wavelengths to a standard, attributes of the product unit can be determined. A method for distinguishing between adjacent product units which are not separated one from the other employs sensing a plurality of decreasing widths followed by a plurality of increasing widths to establish a product end therebetween. Off-loading elements on the conveyor are assigned by location of the product units. Ratios may be employed between different spectra magnitudes which ratios may be further divided by the number of scans taken of any given product unit to establish attributes of the product unit per unit area. A split optic fiber cable may be used to aim the lens assembly through transmitting light in a reverse direction through the cable to impinge on the scan area.

16 Claims, 6 Drawing Sheets

4
4
5
5
6
6
10
12
14
16
18
20
22
24
26
28
30

PRODUCT DISCRIMINATION SYSTEM AND METHOD THEREFOR

This is a continuation in-part of U.S. patent application Ser. No. 204,685, filed June 9, 1988 now abandoned.

BACKGROUND OF THE INVENTION

The field of the present invention is product discrimination systems based on color.

Fruit and vegetable products have been subject to sorting based on color in the past. Initially, such tasks were performed manually. More recently, as labor continues to be more and more expensive and unavailable, machine sorting by color has been attempted. A device capable of sorting by color is described in U.S. Pat. No. 4,106,628 to Warkentin et al., the disclosure of which is incorporated herein by reference. In this system, color from a product unit is directed through lenses, fiber optics and filters to a sensing mechanism. In the actual system, light from both sides of a product unit was gathered in a single scan per product unit by two bundles of optic fibers looking from opposed sides of the product unit. Each optic fiber bundle was split and combined with a respective split portion of the other bundle. Therefore, each resulting optic fiber bundle had light from both sides of the product unit. Filters of different wavelength capacity were employed to filter the light derived from the resulting two fiber optic bundles. Red and green filters were given as examples, one filter for each resulting bundle. The signals generated by the filtered light were then compared with a standard such that a red/green color classification could have been made based on the readings compared with the standard.

More complicated sensing devices have been developed which use line scan cameras for determining such attributes as cross-sectional area. Such cameras have used light to present pixel information which may then be processed for summation and the like. For example, cross-sectional area may be determined by counting the number of pixels registering presence of the product unit. In order to detect color using such a system, a very complicated system would be required because of the substantial amount of data to be received and processed. With product units traveling at any reasonable speed past such a discrimination system, it quickly becomes impossible to keep up with the processing of relevant information without a very substantial data processing system. Further, being constrained to pixel units does not afford adequate latitude in controlling sensitivity.

Difficulties have been encountered in distinguishing between product units which are juxtaposed or overlapping. Recognition of two or more products so situated has been accomplished by noting decreases followed by increases in width. Noting substantial deviations from a length to width ratio of unity has also been used for such product unit recognition. However, irregular shaped units and elongated units have not lent themselves to discrimination using such processes.

SUMMARY OF THE INVENTION

The present invention is directed to a product discrimination system employing the sensing of a variety of light spectra, which may include wavelengths both in and beyond the visible spectrum, from product units being classified. The system may have particular utility in sorting food products such as fruits and vegetables. The magnitudes of the sensed light spectra may be analyzed for determining such attributes of a product as size, ripeness, blemishes and color. According to the present invention, a manageable amount of data is received and processed by such a system with a maximum number of product factors being determined.

In a first aspect of the present invention, a focused image of a product unit is directed to a fiber optic array. The array has a first end which is arranged in a rectangle. Because of this arrangement, the fiber optic cable receives what approximates a line scan image. The image may be averaged and then divided and directed through filters to provide a plurality of sensed signals for different wavelengths. Intensity may be measured for each selected wavelength spectrum. Consequently, only a few signals, the magnitude of each separately filtered portion of the image, need be processed.

In a second aspect of the present invention, methods for discriminating attributes of product units are contemplated which use absolute magnitudes and comparative relationships between magnitudes of various spectra of light sensed from a product unit to determine such attributes as size, color, ripeness and blemishes. Such methods may be carried out on a variety of sensing hardware including line scan cameras as well as the fiber optic system of the preferred embodiment. Even a combination of such systems is contemplated.

In another aspect of the present invention, methods for distinguishing between adjacent product units use specific profile criteria for recognition of a product end and a juxtaposed or overlapping subsequent product beginning. Optical measurements are taken in an area along the conveying path which is thin in the direction of the conveying path and wider than the anticipated product units in a lateral direction. Local widths of the product unit in the scan area may be correlated to the magnitude of observed light spectra from that area. A series of such measurements may, therefore, be analyzed to determine the profile of a product unit. A decrease in width over a set of measurements may be interpreted as the passing of the end of the product unit. Likewise, increasing width measurements may be interpreted as the passing of the beginning of the next product unit. Recognizing certain sequences of these measurements without requiring that the width measurement go to zero may establish the end of one unit and the beginning of the next. Appropriate calculations may then be undertaken to establish the disposition of each of the two product units sensed. Again, a variety of hardware may be employed with such methods.

In a further aspect of the present invention, the presence and extent of each product unit is detected and set up in a series of inventories by off-loading station. Once detected, off-loading mechanisms associated with a conveyor are assigned to the product unit based on its presence and length. By compiling product units by off-loading station, great flexibility is available in dealing with a range of discriminating features and criteria based on multiple product units.

Accordingly, it is an object of the present invention to provide improved apparatus and methods for the discrimination of product units by analysis of a plurality of wavelength spectra of the product unit. Other and further objects and advantages will appear hereinafter.

BRIEF DESCRIPTION OF DRAWINGS

FIG. 7 is a schematic plan view of a two-lane system of the present invention.

DETAILED DESCRIPTION OF THE PREFERRED EMBODIMENT

Figures 1, 2, 3, 4, 5, 6:
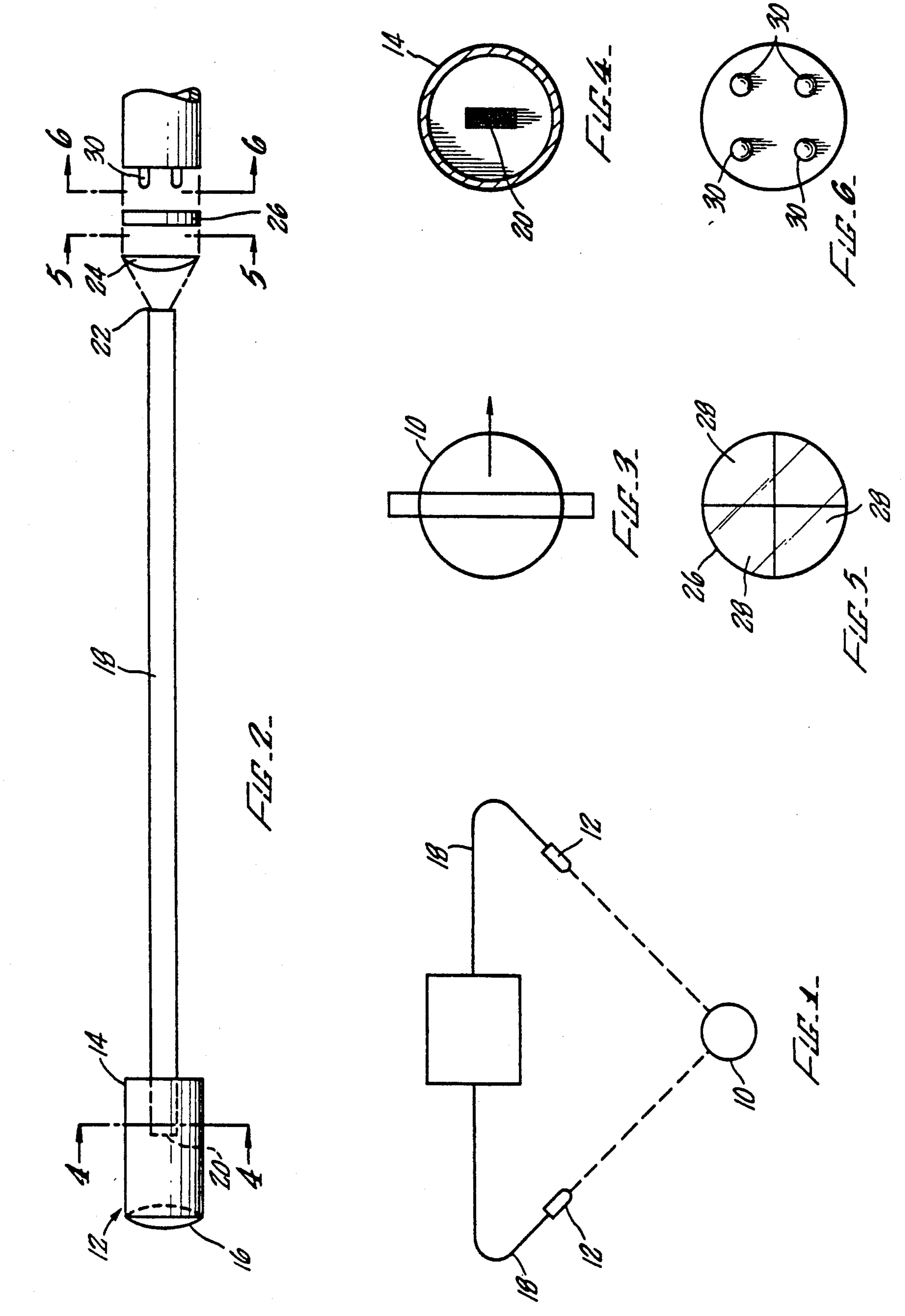
FIG. 1 is a schematic illustration of a discrimination system of the present invention.
FIG. 2 is a schematic illustration of an optical sensing device of the present invention.
FIG. 3 is a schematic view of the viewing area of the device of FIG. 2.
FIG. 4 is a cross-sectional view taken along line 4—4 of FIG. 2.
FIG. 5 is a cross-sectional view taken along line 5—5 of FIG. 2.
FIG. 6 is a cross-sectional view taken along line 6—6 of FIG. 2.
Figure 1:
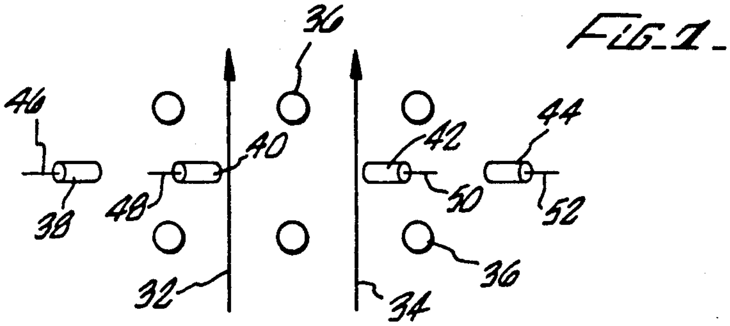

A product discrimination system is schematically illustrated in FIG. 1. One or more objects 10, which are units of product to be sensed, are brought into appropriate position at a viewing station by a conveying means. Such a conveying means is illustrated in co-pending U.S. patent application Ser. No. 200,407, filed May 31, 1988, entitled Off-Loading Conveyor, the disclosure of which is incorporated herein by reference. The objects 10 may be illuminated as needed for appropriate sensing by conventional lights. Lens assemblies 12 are positioned to view and sense the electromagnetic energy, or light spectrum, from the objects 10. The lens assemblies 12 are positioned in accordance with the system design. It is possible to sense characteristics of each product unit passing through a station with one, two, three or more lens assemblies 12 directed at the station. With two such lens assemblies, as illustrated in FIG. 1, a substantial portion of the object may be viewed. Additionally, the object may be rotated for sensing by the same elements or by additional elements further along the conveying path. Fiber optic cables 18 convey the sensed electromagnetic energy to a signal conditioning and processing unit. Depending on the capability of the processing unit, more than one station may be established on separate conveying paths with separate sets of lens assemblies.

Looking in greater detail to the optical sensing device, each lens assembly 12 includes a housing 14 with a lens 16 positioned at an aperture to the housing 14. The lens 16 is positioned at a specific distance from the path along which product units are to pass. With the single lens 16, a focal plan is thus defined within the housing 14. But for the aperture at which the lens 16 is located, the housing 14 is conveniently closed to prevent extraneous light from entering the housing and projecting on the focal plane.

Extending into the lens assembly 12 is a randomized fiber optic cable 18. Such a cable 18 is made up of a plurality of light transmitting fibers which are randomly bundled such that a pattern of light impinging on one end of the cable 18 will be mixed, or averaged, upon exiting the other end of the cable 18.

The cable 18 has a first end which is positioned at the focal plane of the lens 16. Further, the first end is arranged in a thin rectangular pattern in that focal plane. The pattern of this first end 20 is best illustrated in FIG. 4. The arrangement of the first end 20 in a thin rectangular array at the focal plane of the lens 16 causes the image received by the cable 18 to be a thin rectangular scan area of the pathway through which product units travel. The image received by the cable 18 is, therefore, like that of a line scan camera. The length of the scan area transverse to the direction of movement of the product unit is preferably greater than the largest dimension transverse to the conveying path of any anticipated product unit. The width of the rectangular scan area parallel to the direction of movement is substantially smaller than the dimension along the conveying path of the anticipated product units. Given a constant speed of advancement of each product unit along the conveying path, the discrimination system can be configured such that sequential sensings are made as the product passes by the lens assemblies 12. A complete view of the product unit may be achieved by collecting sequential readings from the scan area as the product moves across that scan area.

The light energy received by the rectangular first end 20 of the cable 18 is transmitted along the cable to a second end 22. The second end 22 is conveniently circular in the present embodiment. The light transmitted through the cable is averaged and directed against a plano convex lens 24. The lens 24 is positioned such that the second end 22 lies at the focal point of the lens. Thus, the light passing through the lens from the second end 22 of the cable 18 is directed in a substantially nonconverging and nondiverging path. If the second end 22 of the cable 18 is in a circular shape, a similar yet magnified pattern will be transmitted by the lens 24.

Adjacent the lens 24 is a filter assembly 26. The filter assembly 26 may be positioned against or near the lens 24 to receive the light from the cable !8. The filter assembly 26 includes filter elements 28. The filter elements 28 are selected such that the separate elements filter different spectra of light. Thus, the filter assembly may include, for example, a red filter, a green filter, a yellow filter and even a filter outside of the visible spectrum. If the light from the lens 24 is arranged as discussed above, the filter assembly 26 is most conveniently circular with sectors of the circular assembly constituting the filter elements 28. Thus, from a rectangular image of a small slice of the product unit being viewed, a plurality of differently filtered light portions of the averaged light of the image are derived through the filter assembly 26. Four such equal portions are shown in the preferred embodiment. However, other arrangements could well be found beneficial for viewing particular product units.

To receive the divided and filtered portions of light from the original image, photodiodes 30 are presented adjacent the filter elements 28. In the preferred embodiment, one such diode 30 is associated with each filter element sector 28. Thus, an electronic signal is generated by each diode responsive to the magnitude of light conveyed through each of the filter elements.

The magnitude of each filtered portion may be compared against a standard stored in the data processing unit or converted by a factor or factors developed from prior comparisons with standard samples or tests. The accumulated segments or views making up an image formed by sequential images of the entire unit may also be processed in like manner. The standards within the processor for forming a basis for data conversion can be derived from sample product units having known physical attributes. Thus a pattern of magnitudes from the separate filtered portions or accumulation of portions for an entire unit can be compared with standards or converted for cross-sectional size and indications of blemish, ripeness and color.

Figure 8:
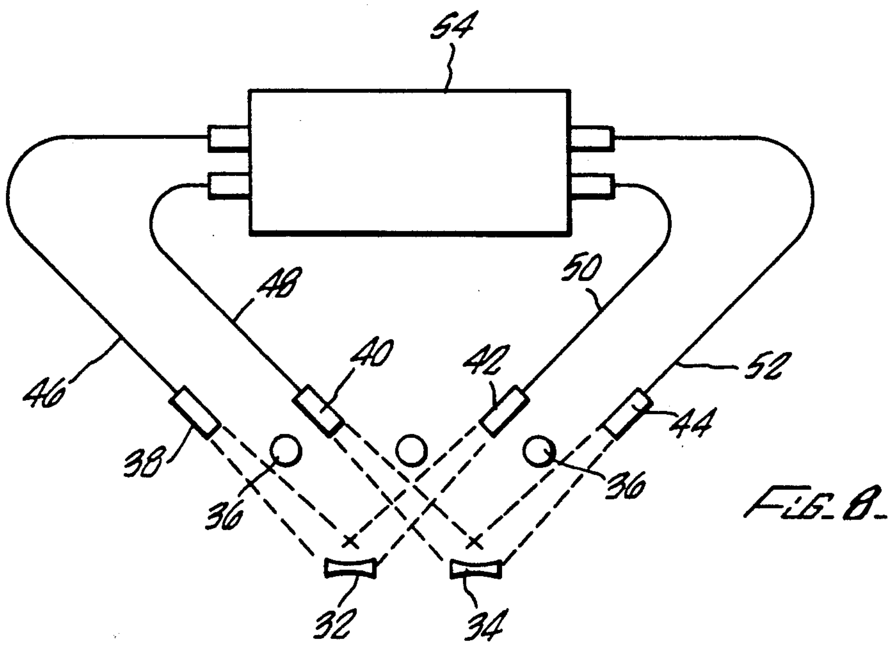
FIG. 8 is an end view schematically illustrating the two-lane system.

Looking next to the embodiment of FIGS. 7 and 8, a product discrimination system is designed for two lanes of conveyed product units. FIG. 7 schematically illustrates the layout of this system in plan. The two lanes 32 and 34 are illustrated by directional arrows. Positioned equidistant from the scan area on each of the lanes 32 and 34 are lights 36. Six such lights 36 are employed such that the two center lights 36 illuminate both lanes 32 and 34. The two areas at which product conveyed along lanes 32 and 34 is to be scanned are in line with the lens assemblies 38, 40, 42 and 44. Thus, as can be seen, the scan areas are each equidistant from a set of four lights.

FIG. 8 illustrates the same mechanism taken along an end view of the lanes 32 and 34. In this schematic drawing, the lanes are represented by bowtie rollers as may actually be employed. The lights 36 are arranged to project light below the level scanned by the lens assemblies 38–44 on product units assumed to be generally spherical in shape. Lens assemblies 38 and 42 are arranged to cover the lane 32 while lens assemblies 40 and 44 are arranged to cover the lane 34. Naturally, a size range of product units is contemplated. The lens assemblies are preferably arranged to cover all of the anticipated range of sizes or adjustably mounted to do so.

When arranged as shown, the lens assemblies provide coverage of a substantial portion of any spherical product unit. Only the direct underside of the product unit is missed. If the whole product must be scanned, the product may be turned and viewed again. One such conveyor system capable of turning product is illustrated in co-pending U.S. patent application Ser. No. 515,313 filed July 18, 1983, entitled Product Handling System, the disclosure of which is incorporated herein by reference.

Again, FIG. 3 illustrates the view of a product unit taken by each of these lens assemblies. The images thus received by the lens assemblies are conveyed by means of randomized fiber optic cables 46, 48, 50 and 52 to a central processing unit 54. The cables are randomized to the extent that the light received by the lens assemblies are mixed to an average such that the image received by the end of the fiber optic cable is transmitted as a substantially uniform intensity beam with the image substantially mixed to create a uniform output.

Figure 9:
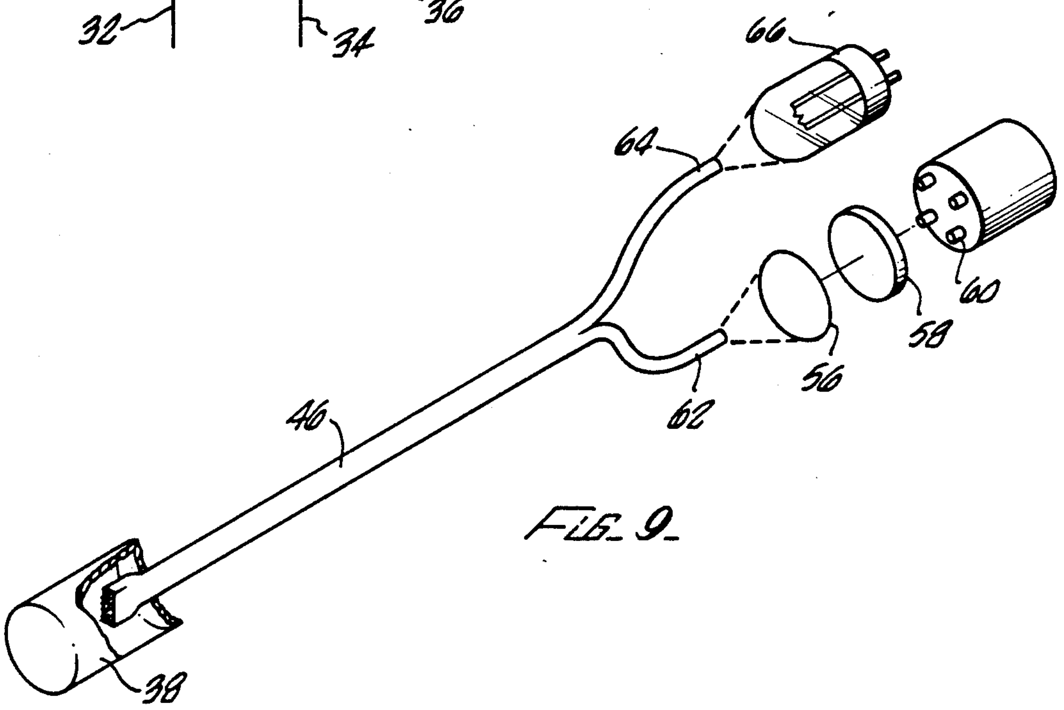
FIG. 9 is a perspective view of an optical sensing device of the present invention having a portion of a fiber optic cable split into two parts.

FIG. 9 illustrates a specific optical sensing system including a lens assembly 38, a fiber optic cable 46, a plano convex lens 56, a filter assembly 58 and photodiodes 60. In this embodiment, the randomized cable 46 is split into two portions 62 and 64. The first portion 62 directs light to the plano convex lens 56. The second portion 64 is in line with a light 66. The light path from the lens assembly 38 through the photodiode 60 has previously been described. During operation, light is also transmitted to the portion 64 such that it impinges on the light 66. However, this light impingement is not used in the present embodiment. Rather, for set up purposes, the light 66 may be employed to direct randomized illumination toward the lens assembly 38 as well at the target area in the conveying path. This enables the lens assembly 38 to be appropriately aligned for proper sensing. Once the lens assembly 38 is aligned, the light 66 is shut off. Similar systems may be employed for assemblies 38, 40, 42 and 44. Such a split and fully randomized optic cables have been used to supply light to the field of microscopes and have been adapted here for the present purposes.

Figure 10:
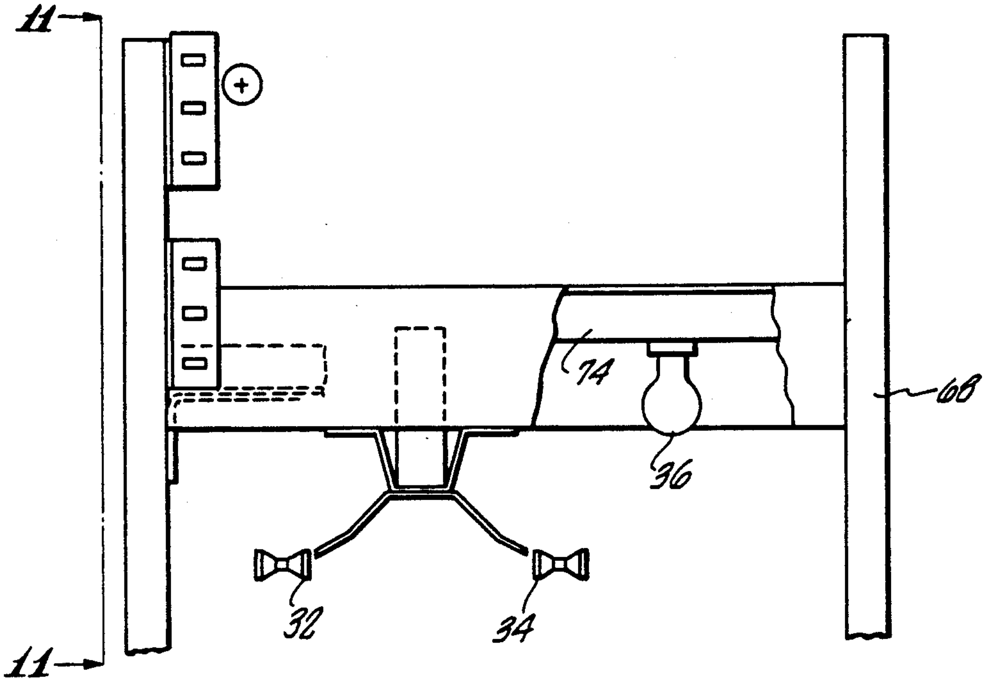
FIG. 10 is an end view of a two-lane sizer of the present invention.
Figure 11:
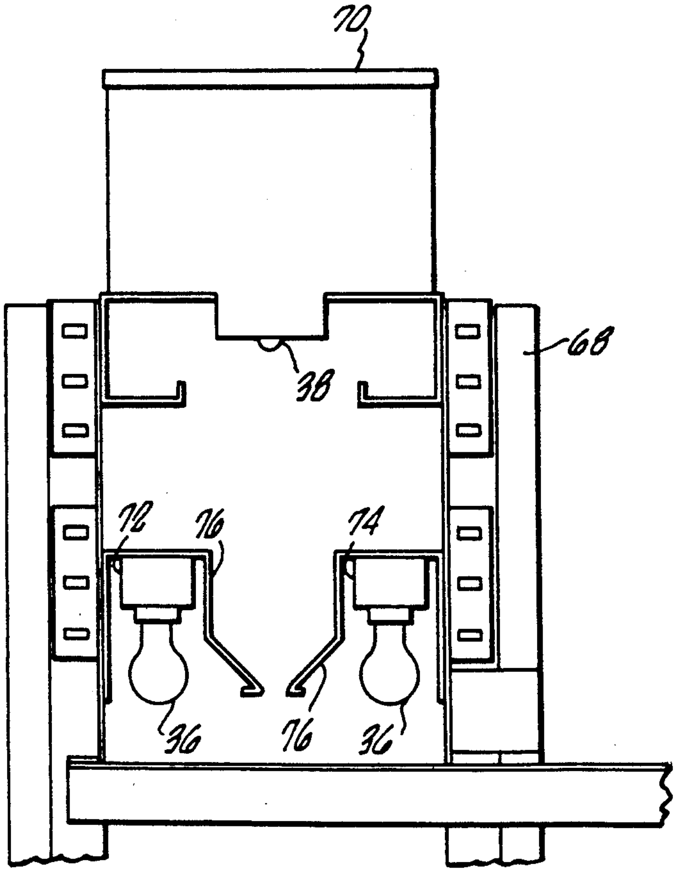
FIG. 11 is a side view taken along line 11—11 of FIG. 10.

Turning next to a depiction of certain of the hardware for the layout of FIG. 7, reference is made to FIGS. 10 and 11. A frame structure 68 composed of four standards is illustrated as supporting the optic sensing system and the lighting system. Supported on the frame structure 68 is an optics assembly 70. The optics assembly 70 basically includes the central processing unit 54 and the several elements illustrated in FIG. 9, arranged substantially as seen in FIGS. 7 and 8. Naturally, the fiber optic cables provide great flexibility to the location and orientation of the lens assemblies for viewing product.

Extending across the frame structure 68 are two lighting boxes 72 and 74. These boxes 72 and 74 each mount three lights 36 arranged as can best be seen in FIG. 7. Surrounding each of the light boxes 72 and 74 and extending downwardly about the lights 36 are shields 76. The shields 76 are arranged to provide substantial illumination of the product units on the conveying lanes 32 and 34. Incandescent lightbulbs 36 are used in this context to provide a broad spectrum of light to the product units. The shields allow light to be presented on the product units as they pass through the scan area and, at the same time, act to cut off direct light from the lights 36 from reaching the lens assemblies 38 through 44. One lens assembly 38 is illustrated in FIG. 1 to clearly show the function of the shield 76.

In the preferred embodiment, the lights 36 are 75 watt incandescent bulbs set nine inches apart in the pattern best illustrated in FIG. 7. The lens assemblies are located about nineteen inches above the level of the conveying path and are arranged to view the product units at about 45° from the vertical. The shields 76 provide approximately a one-inch slit to allow the lens assemblies to view the product therethrough. The areas scanned by the lens assemblies are best illustrated in FIG. 8 with the image actually sampled by each lens assembly being a thin area as represented in FIG. 3.

Associated with the mechanisms of the present invention to provide an indexing function for the central processing unit is an encoder (not shown). When a chain based conveying system is employed, the encoder may be positioned on an idler shaft engaging the chain through a sprocket. The encoder contemplated with the preferred embodiment generates a voltage pulse with the advancement of the associated shaft through a preselected angle. In the preferred embodiment of the present invention, the encoder set up and physical sprocket size are arranged to have such a voltage pulse with every one-eight of an inch of conveyor travel.

The encoder is also contemplated to have circuitry to account for the conveyor chain moving backwards. The encoder counts the number of backward steps without sending any pulse and then does not send pulses representing forward movement of the sprocket until the forward increments equal the just prior backward increments of movement. Accordingly, the encoder itself handles the logic necessary for generating pulses only for forward movement. The encoder also provides a reference signal for every revolution of the encoder in addition to the pulses indicating specific angular advance. These signals are sent to the central processing unit to coordinate the scanning with the conveyor location.

Figure 12:
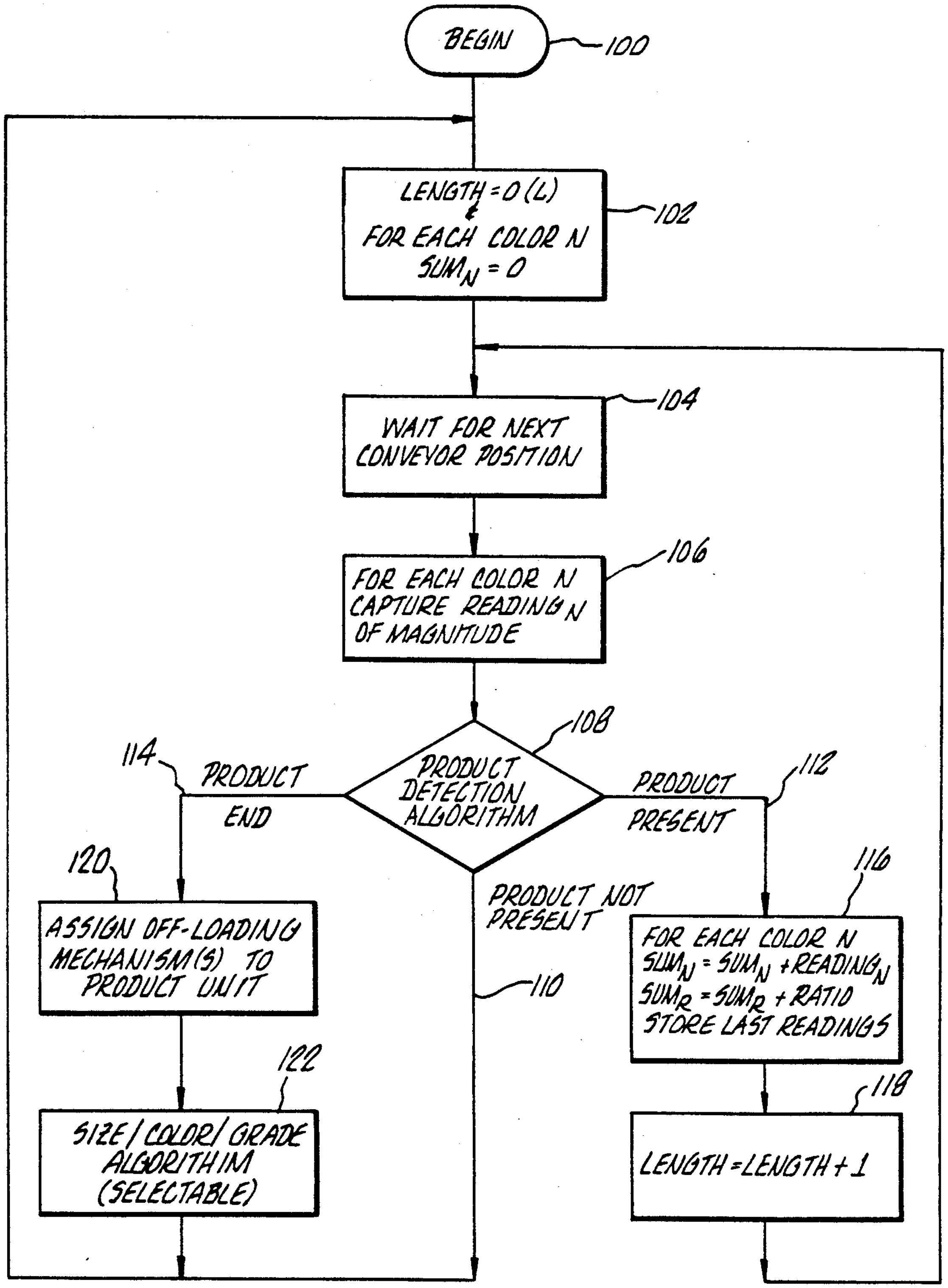
FIG. 12 is a logic flow chart for analysis of the sensed light.

FIG. 12 schematically illustrates analysis of the scanned light received by the photodiodes 30. The preferred embodiment employs the described optic fiber system and operates on the scanned magnitudes. However, actual line scan hardware may be employed to initially generate the signals operated upon in certain of the methods set forth herein. For example, a width magnitude may be generated by counting the pixel width of each scan and then processing through step 6 as will be described. Naturally more than one system of generating signals may be employed as well. Step 100 initiates the program. Step 102 initializes the sensed values, i.e., the product length and the magnitudes of the light spectra separately sensed.

At step 102, the product length is set to zero. Product length is the length of the product in the direction of motion of the conveyor regardless of the product orientation. For example, what might normally be thought of as the product length may be lying crosswise to the conveyor and hence become its width as recognized by the system for purposes of discrimination. The length is measured in units of movement of the conveyor by the indexing mechanism above described.

The summation of light magnitudes perceived by the photodiodes 30 is also set to zero as are any nonsummed specific magnitudes which are stored by the system. With multiple diodes 30, a plurality of light magnitudes may be stored in separate sums or operated upon and then stored individually or as summations. In the present example, four such magnitude are processed by the system with options as to how they may be processed, and stored.

Step 104 sequences the measurement of light magnitude to coincide with the presentation of a new unit length of product. This step is controlled by the indexing mechanism for the conveyor. As noted above, the indexing mechanism employs an encoder generating a signal indicative of specific advancement beyond any prior advancement. Consequently, no signal is received during a backup of the conveyor or advancement of the conveyor following a backup until a new increment of advancement has been sensed. Thus, step 104 will be inactive through such motion until receiving the next encoder signal representing the advancement of the conveyor beyond all prior advancements. By viewing sequential portions, or slices, of the product as it passes through the scan area, a line scan process is approximated. However, the light received is averaged and individual units of the line scan, or pixels, do not exist. Thus, the useful attribute received is average selected spectra magnitudes.

Step 106 receives the magnitude of each light spectra sensed as the successive unit length passes through the scan area. This receipt of signals is controlled by step 104 such that contiguous areas each one increment in length (⅛" in the preferred embodiment) and the actual dimension of the product transverse to the direction of motion of the conveyor are scanned and received in step 106. The magnitudes of the selected light spectra are sensed by the photodiodes 30 and may be stored or operated upon and then stored at this step.

Step 108 detects whether or not a product unit is present and whether or not the product unit just ceased to be present at the scan area. A threshold intensity (MINW) is required at step 108. This minimum is preferably adjustable and is typically set at approximately the equivalent of one-half inch in sensed product width. Thus, the collection of data does not begin until a magnitude equivalent of at least approximately one-half inch of width is sensed and ends when less than one-half inch is sensed following the passage of a product unit. The adjustability gives control over the sensitivity of the system to items on the conveyor so as to control recognition of product units and debris having a maximum width below the threshold.

If no product is sensed and no product was sensed in the just prior view, the PRODUCT NOT PRESENT logic path 110 is selected. Under this circumstance, logic step 102 is again initiated. If a product is sensed as being present, the PRODUCT PRESENT logic path 112 is followed. If a product unit is not sensed but the just prior view or views did sense a product unit, the PRODUCT END logic path 114 is followed.

Figure 13A:
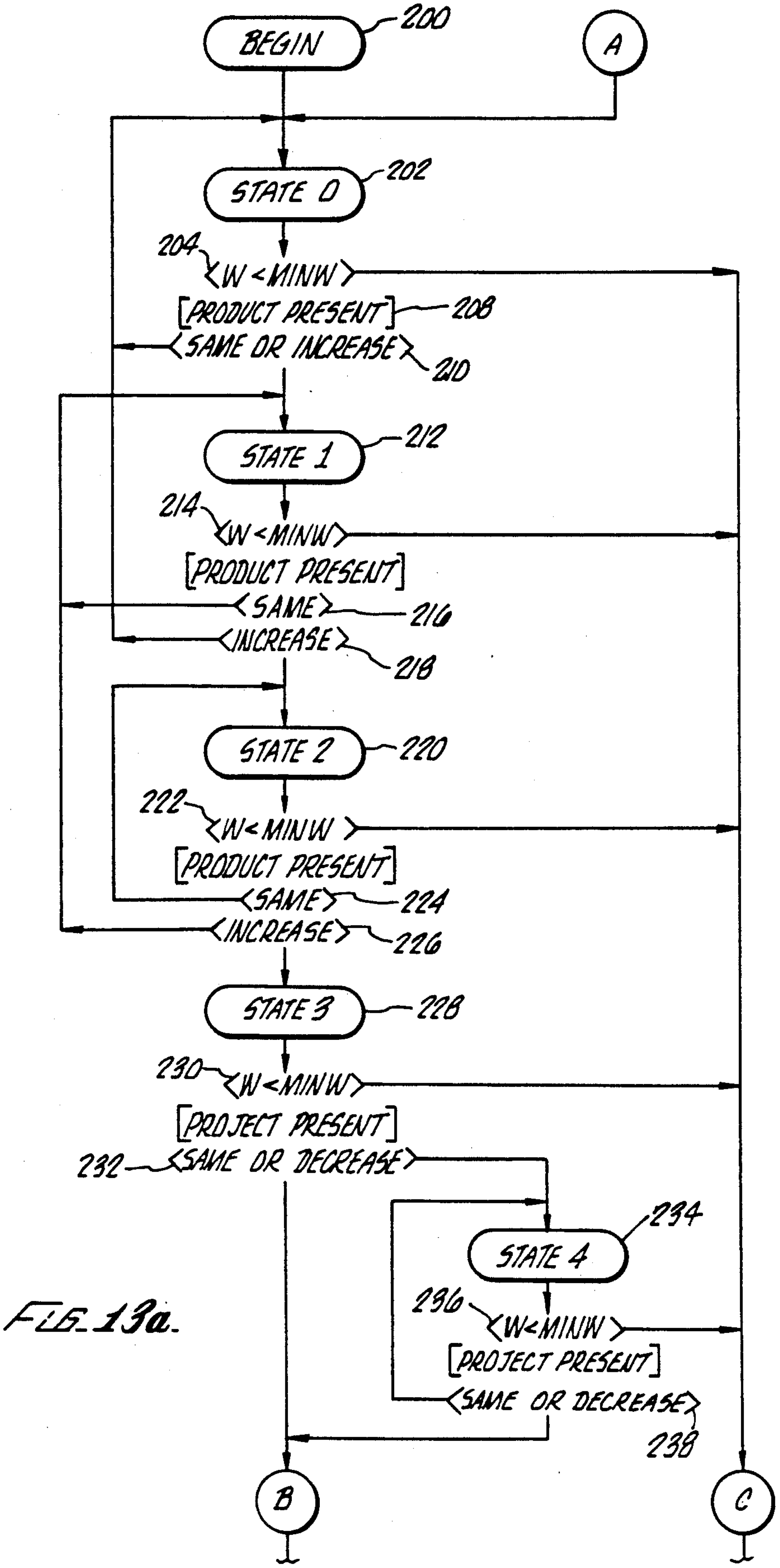
FIG. 13 is a product detection algorithm for discriminating between product units.
Figure 13B:
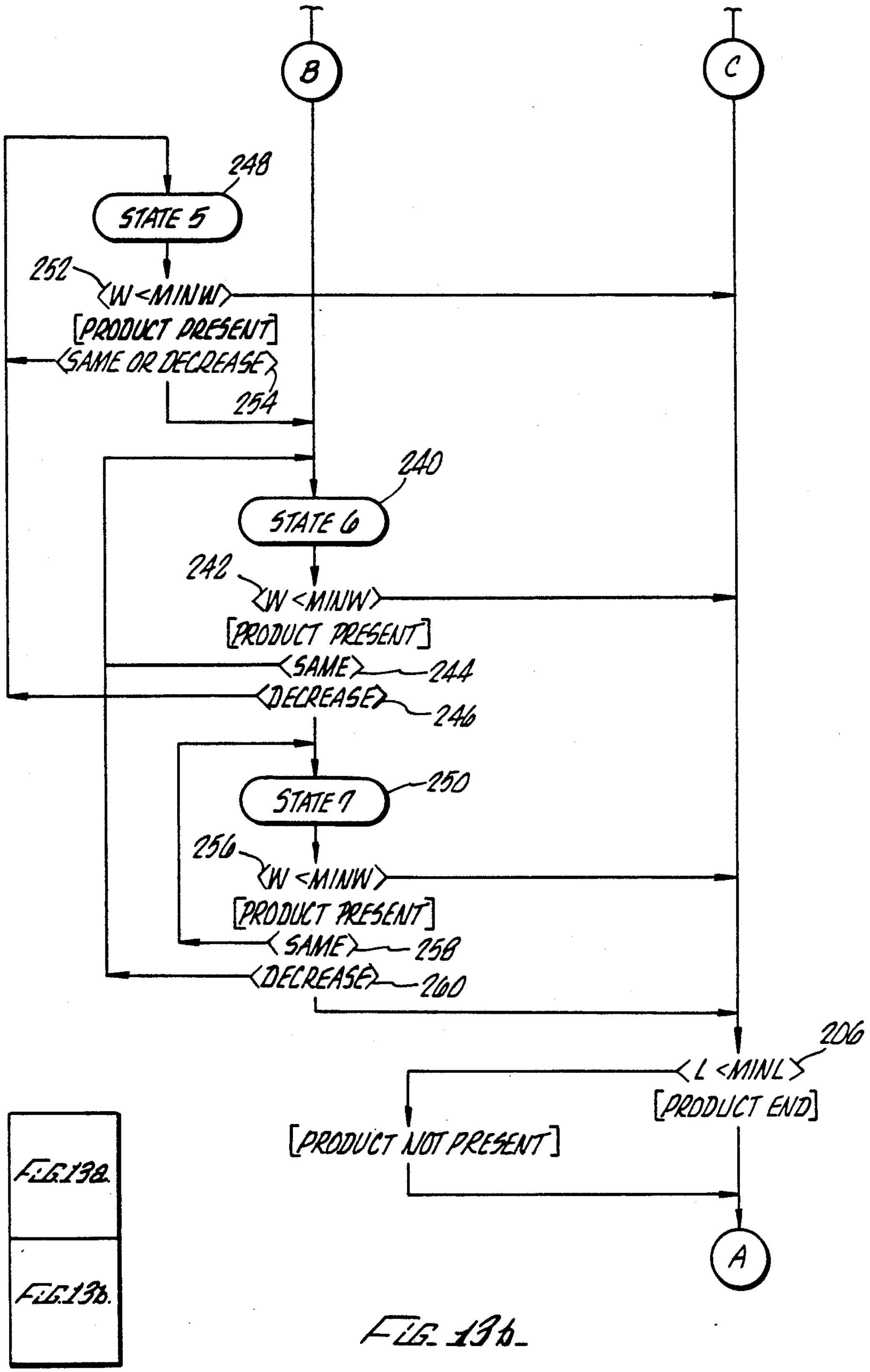

The product detection algorithm preferably includes a process for discrimination between two products which are touching as well as a process for sensing PRODUCT PRESENT and PRODUCT END for individual product units. When two products are touching or slightly overlapping, the magnitudes sensed may never fall below the threshold necessary for directly recording PRODUCT END. Under such circumstances, the system would simply sense a very large or long product were it not for some device which would otherwise sense some parameter indicating the presence of two product units. Reference is made to FIG. 13 which presents the logic associated with this discrimination process as well as a simple discrimination of individual product units.

In overview, discrimination between touching product units is accomplished by noting a series of decreasing width magnitudes followed by a series of increasing width magnitudes. This could be practiced using a series of one each. However, one decrease followed by one increase is overly sensitive and subject to false findings of PRODUCT END. The preferred embodiment employs a several-step series for both decreasing and increasing widths. When the system senses three sequentially decreasing magnitudes in the spectra employed for width determination followed by a sequence of three such measurements of increasing magnitude, the system recognizes a product division between the decreasing sequence and the increasing sequence. Alternatively, when two decreases are followed by one increase in the magnitude representing width, then two further decreases satisfy the first part of the test. The same may be applied to the part of the test for significant increase. Combinations of the above for decreases and increases are also possible. Measurements of no change are ignored in the test regardless of where they may appear.

Turning specifically to FIG. 13, the product detection algorithm creates states which are preserved or changed with subsequent scans. The initial scan from step 106 is treated at State 0 by the product detection algorithm 108 because of the BEGIN routine at 200. Each new scan thereafter, as timed by the encoder in step 104, is tested according to the state of the algorithm as determined by prior scans.

Following the BEGIN routine or with the algorithm in the PRODUCT NOT PRESENT mode, the algorithm is at State 0 as indicated at 202. A first test 204 is undertaken effectively to determine the existence of any product unit present in the scan area. This is accomplished by testing the magnitude of the sensed spectra captured in step 106 which is used for product unit width analysis. If no product unit has arrived at the scan area or if the advancing product unit has a first measured width (W) which is less than the threshold width (MINW), then the algorithm advances to a comparison of the product length at step 206. If the width (W) equals or exceeds the threshold width (MINW), then a product is considered to be present at 208 and a test is performed at step 210 to determine the incremental change, if any, in product width over the immediately prior measured width.

The test for a minimum width (MINW) as at 204 is undertaken at each state, thereby subjecting each scan to an initial test of whether any product unit was sensed in the scan area. If not, the algorithm selects either the PRODUCT NOT PRESENT logic path 110 or the PRODUCT END logic path 114 through step 206. In either case, the algorithm returns to State 0 as the process is not needed by which a PRODUCT END is determined by reference.

In determining whether a scan of magnitude is an increase, a decrease or no change over the immediately prior scan, the system recognizes an incremental change between successive magnitudes only at or in excess of a certain threshold incremental change. Thus, a determination is made that a successive magnitude is the same if it differs from the immediately prior magnitude by being greater than the negative of the threshold for incremental change and less than the positive threshold for incremental change. To register an increase, the incremental change between successive magnitudes is to be equal to or greater than the threshold incremental change. Similarly, to register a decrease, the incremental change is to be equal to or less than the negative of the threshold incremental change. This threshold as to incremental change is adjustable to give control over sensitivity of the system in determining PRODUCT END. The magnitudes in the selected spectra used for approximation of width (W) may be better understood if referred to in terms of width and the incremental changes between successive magnitudes as incremental changes in width of the product unit.

The determination of incremental width over the just prior measurement of width, if any, is undertaken at step 210. If the width has not changed or has increased over the prior scan, the system remains at State 0. The state changes are only effected to test for touching or overlapping product units where a PRODUCT END needs to be inferred. Increasing or constant width (W) not preceded by decreasing width (W) does not indicate an upcoming PRODUCT END; and, therefore, the process need not be initiated. With the width (W) being sensed, the program follows the PRODUCT PRESENT logic path 112. If the test at step 210 is not met, indicating a decrease in product width (W) over the immediately prior scanned width (W), the system advances to State 1. Again the PRODUCT PRESENT logic path 112 is taken. Once logic path 112 has been completed, the program recycles to wait for the next conveyor position at step 104. With the next scan, step 106 is repeated and the algorithm 108 again tests the then current width measurement. Depending on the prior measurements, the algorithm either repeats the steps of State 0 described above or performs the test of State 1.

In State 1, the now current scan measurement of width is again tested at step 214 to see if there is a minimum product width present in the scan area. If not, step 206 is again undertaken and on of logic paths 110 or 114 is followed. If at step 214 the product is determined to be present, step 216 determines if the width measurement has remained within the limits of the threshold value of incremental change. If such is the case, the width is considered not to have changed from the prior measurement and the system remains at State 1. In the process of determining a PRODUCT END, this response of maintaining the same state is, in effect, simply not counting measurements where the width has not changed. Where a width change is found, increases above the threshold incremental increase are detected and the system is reset at State 0 while decreases cause an advance to State 2 at 220 and the PRODUCT PRESENT logic path 112 is followed.

When a product unit which is generally spherical passes through the scan area, a series of increases in width will first be detected and the state of the product throughout approximately the first half of its path across the scan area will maintain the algorithm at State 0. Through the second half, decreases will be observed which will advance the algorithm through several of the states. Thus, if the product is nearing the end of its passage across the sensing area, the second state at 220 would be achieved. State 2 establishes that there have been two decreases in width (W), each having an incremental decrease larger than the threshold incremental change. If the product has been decreasing in width but evens out, the state simply does not advance. Consequently, a prior decrease followed by no incremental change above the minimum threshold simply preserves the prior state rather than advancing the state or returning the state to State 0.

With State 2 achieved, the next width measurement is tested at step 222 which operates identically to steps 204 and 214. If step 222 is not satisfied, the product is considered present and step 224 is initiated. Step 224 operates identically to step 216 in testing whether the width is the same as the just prior width. If so, the state is unchanged, remaining at State 2. If step 224 is not satisfied, step 226 tests for an increase in width. If an increase is determined, the state of the algorithm drops one level to State 1. If the tests of steps 224 and 226 are not satisfied, the algorithm advances to State 3, indicated at 228. In all cases except where the test at step 222 is satisfied, the PRODUCT PRESENT logic path 112 is then followed.

At State 3, the first part of the test is satisfied for determining PRODUCT END even though an adjacent product unit may be touching. In reaching State 3, at least three decreases in width have been sensed. If this state is then followed by at least three increases in width, the system will recognize what it has just read as a PRODUCT END. Of course, the simple PRODUCT PRESENT test, that of not sensing a width at least equal to the threshold value, will signal product end at any point in this process. Once having satisfied this first criteria of a specific plurality of decreases in width, it cannot be retracted by subsequent measurements until a product end is established.

At State 3, the subsequent measurement of width is also tested against the minimum threshold at step 230. The lack of a measurable width results in PRODUCT END. If the product remains present, the width is measured against the just prior width at step 232. If the present width is the same or a decrease over the just prior width, State 4 is established at 234. If the product is increasing in width, the process proceeds to state 6. In either case, the PRODUCT PRESENT logic path 112 is followed.

At State 4 the next measured width is compared with the threshold in step 236 to determine the presence or absence of the product. If the product is present, a determination is made as to whether the product has increased, stayed the same or decreased in width over the immediately prior measurement. As the process has now established a substantial decrease with at least three decreases in width, the program will now recycle at State 4 for each subsequent width measurement where there is no increase. This is accomplished at step 238. Stated logically, if an increase in width is sensed in either State 3 or State 4, an assumption is made that the system is likely seeing a new product adjacent to an old product. However, this must be confirmed. Consequently, any time an increase is sensed in either State 3 or State 4, State 6 at 240 is instituted to require additional increases. PRODUCT PRESENT logic path 112 continues to be followed.

With the next measurement to be taken, the algorithm test for the presence of the product in step 242. If no width is measured, PRODUCT END is established. With the product present, the width is tested, again to determine the direction of incremental change, if any. If there is no change in width over the prior measurement, State 6 is maintained at step 244. If an incremental decrease greater than the threshold is sensed, step 246 establishes a State 5 at 248. If an increase is sensed, State 7 at 250 is introduced. The program is now attempting to fulfill the second requirement, i.e., multiple increases. Therefore, State 5 is established to create another test determining an increase if a decrease has been sensed at State 6. In this way, State 5 adds to the burden of finding increases before a change in product is recognized. Regardless of which of States 5, 6, or 7 is selected, the product is still present and logic path 112 is followed.

In State 5, the next succeeding measurement is compared to determine the presence of the product in step 252. If not present, PRODUCT END is signaled. If present, the change in that product width is tested at 254. If the product has not changed in width beyond the incremental width threshold or has decreased in width, State 5 is maintained. If the product width has increased beyond the incremental threshold, State 6 is again established. Again, following each selection of state, logic path 112 is followed.

In State 7, the succeeding measurement is tested to determine product presence at step 256. If the product is present then the change in width is again tested. If there has been no incremental change at least equal to the incremental threshold, State 7is maintained through step 258. If there has been an incremental change which is a decrease, the state is changed to State 6 by step 260. Thus, if a decrease is sensed at State 7, it becomes more difficult to establish a product end. If an increase is found at State 7, the criteria has been satisfied and PRODUCT END is established. The state of the algorithm then returns to State 0 and PRODUCT END logic path 114 is followed.

From the foregoing it can be seen that two tests are available for determining PRODUCT END. First, and at every state of the process, the sensing of no product width of at least the threshold value will establish either PRODUCT END or PRODUCT NOT PRESENT. Second, in spite of there not being a scan lacking product width, a plurality of decreases followed by a plurality of increases may be employed to establish PRODUCT END between touching products.

Three minimum possibilities exist in comparing adjacent width measurements. The product may be increasing in width (I), decreasing in width (D) or not increasing or decreasing sufficiently to reach incremental threshold values. The program effectively does not count reachings in which there is no change between adjacent readings for the purpose of inferring PRODUCT END. As to increases and decreases, certain minimum requirements for decreasing and then increasing signals are necessary to establish a product end between touching products. One of three minimum scenarios are required. These are set out in association with the state of the program present at the time each is determined.

| | | |
|---|---|---|
| State 0-D | State 0-D | State 0-D |
| State 1-D | State 1-D | State 1-D |
| State 2-I | State 2-I | State 2-D |
| State 1-D | State 1-D | State 3-I |
| State 2-D | State 2-D | State 6-I |
| State 3-I | State 3-I | State 7-D |
| State 6-I | State 6-I | State 6-I |
| State 7-D | State 7-I | State 7-I |
| State 6-I | | |
| State 7-I | | |

The lines drawn within each column indicate the satisfaction of the first requirement for a decrease in product width where the program accepts that the product has sufficiently decreased and begins to look for satisfaction of sufficient product increase to establish PRODUCT END.

Through the product detection algorithm, certain signals are generated. These signals include PRODUCT END, PRODUCT PRESENT and PRODUCT NOT PRESENT. One of these signals is generated responsive to each successive measurement. The PRODUCT END signal may be arrived at by either of two methods. The PRODUCT END may be satisfied by a width measurement which simply does not meet the minimum threshold at any one of steps 204, 214, 222, 230, 236, 242, 252, and 256. Alternatively, the PRODUCT END SIGNAL may be generated if the end of a product unit is inferred from reaching State 7 in the product detection algorithm 108.

Under the latter method where a PRODUCT END is inferred, the PRODUCT END is not determined until after the actual PRODUCT END has passed by at least three increments. Consequently, in this condition the first product unit would be given additional increments and the second product unit would be lacking increments if the PRODUCT END was established at the current measurement. To avoid this problem, when the PRODUCT END is signaled through State 7, three prior measurements are taken from the data associated with the just prior product unit and attributed to the second product unit then passing through the viewing area. This is accomplished by separately maintaining the three most recent scan measurements. In this way, the program has the capability of allocating measurements according to its perception of the location of each inferred PRODUCT END.

Looking to Step 206 in the product detection algorithm 108, this step is reached either when no product width is measured in the scan area or when an increase in width of a product unit is sensed in the scan area and the algorithm is at State 7. In either case, the then existing accumulated product length (L) as determined at step 118 is compared with a minimum length (MINL). If the accumulated length has not reached the minimum, PRODUCT NOT PRESENT is determined and logic path 110 is followed. This results in all measurements being initialized at zero at step 102. If the minimum length (MINL) is satisfied, PRODUCT END is determined and logic path 114 is followed. The minimum length (MINL) may be set at values of a plurality of integers so that the system will simply not recognize single occurrences of false readings or very small objects which would be considered debris.

In the PRODUCT PRESENT logic path 112 when a product is sensed, the magnitude of at least the light spectra used for measuring width of the product is added to any prior sum of such magnitudes in logic step 116. When the first scan of a product unit passing through the scan area occurs, the sum is zero from logic step 102. In successive scans, each reading is added to the cumulative sum of magnitudes. The length (L) is also summed in a similar manner with each scan being added to the prior length in step 118. Logic step 104 is then instituted to time the next scan.

In addition to the summation of spectra magnitudes and the accumulation of length, other events may be occurring. Employing two sensing positions such as through lens assemblies 12 in FIG. 1 generates two magnitudes at each filtered spectra. These may be summed together and employed as a single magnitude measurement. By doing so, the calibration process of the program effectively averages these corresponding readings taken simultaneously in correlating magnitude with actual width or other derived parameter. Once the simultaneously sensed magnitudes for each given spectra are separately combined, they may simply be treated as a single magnitude in all of the subsequent logic steps. Obviously, more than two such sensors may be arranged to further average the simultaneous readings taken of the product units.

As noted above, three readings are kept on a revolving basis such that they are sequentially the three prior readings to the current reading being processed. These readings are maintained and updated in the PRODUCT PRESENT logic path 112.

Also during the PRODUCT PRESENT operation, specific readings may be looked for and processed for later use in the PRODUCT END logic path 114. For example, a maximum width measurement may be taken and separately maintained. Five readings indicative of width may be separately stored. Each new width sensed would be compared with the five stored widths and would replace the smallest such width if it is larger than that width. Thus, at PRODUCT END, the five maximum widths of a product unit are retained. To meet an European standard of measuring product units, a process may then be undertaken where the largest such width measurement is discarded and an average is taken of the next four such width measurements.

Summations may also be taken of ratios of readings in the PRODUCT PRESENT mode of operation. For example, when color is being sensed for purposes such as ripeness, the magnitude of readings must be normalized to remove the factor of the size of the unit. Taking tomatoes as an example, red spectra indicates ripeness while green spectra indicates immaturity. Infrared spectra best illustrates cross-sectional area. To remove the size factor, the ratio of red to infrared would present an average red intensity per unit width. This may then be normalized for length and compared with a standard to determine ripeness. As an alternative, such a reading could be enhanced by taking the ratio of red to green. Since these colors are opposites as they pertain to maturity, this provides a sensitized result per unit width. The ratio may be taken before they are accumulated as a sum as indicated in step 116. Obviously combinations of ratios or size accumulations or maximum diameters may be employed wherein the first such combination could be used as a condition with the second feature being used for sorting those product units which meet the condition.

As with size, the ratios may be kept in terms of absolute magnitude. For example, the highest or lowest ratio may be stored or the average of the highest or lowest ratio over a small number of measurements may be stored, either one to be used for comparison with a constant to determine extreme conditions such as would occur with a defect.

The wavelength which best reflects the width of the item viewed is infrared. Consequently, infrared is preferably used through a summation to approximate the cross-sectional area and in turn the weight of each product unit. The log of the sum of intensities recorded may conveniently be employed to establish a linear relationship between weight and intensity.

At PRODUCT END as determined by a lack of sufficient magnitude of width to reach the threshold level, the accumulating sums, lengths and specific measurements are then processed in the PRODUCT END logic path 114. In the case of a PRODUCT END being derived through State 7 because of juxtaposed product units, the three prior readings which have been separately saved are subtracted from all of the summations of the prior product unit and are added to the subsequent product unit for which summations are being accumulated concurrently. Additionally, the end of the product is located as to its position on the conveyor. In the case of a PRODUCT END signal from State 7, this location would be three measurements back from the measurement being taken at the time of the PRODUCT END signal.

Looking at the possible calculations at PRODUCT END as indicated in step 122, the accumulated sum of the infrared signal magnitudes for the product unit could be compared directly with a chart of product categories. The IR magnitude best correlates with cross-sectional area and in turn product weight. By a comparison of the summed magnitude with the table of magnitude ranges, each product unit may be categorized by weight. Where maximum dimension is a preferred means for categorizing, according to European standards, the accumulated five maximum measurements may be operated upon by discarding the maximum measurement of these and averaging the next four. Again, this value may be compared with a chart to categorize the product unit.

For certain measurements, the size of the unit must be extracted from the reading so as to provide a magnitude or ratio which is normalized. By employing a ratio of two sensor readings, the width is normalized. By additionally dividing by the accumulated length of the product unit, the area is then factored out of the measurement. Tables providing category ranges for any such measurements or calculations can then be employed to properly categorize each product unit.

In order to then properly distribute the product units based on the observed parameter, the location of the unit on the conveyor must be monitored. The data employed for locating the product on the conveyor is the PRODUCT END location and the length of the associated product unit. The end location is established through the encoder signal. With the signal from the encoder, the end signal on a product unit and the product unit length, the program then selects the off loading element or elements which will operate to off load the product at the appropriate exit point at step 120. The value or values of the selecting parameters are assigned to each product unit and categorized. The categorized product unit is then correlated with a table or matrix from which an exit point are assigned.

Given the information regarding location and the assigned exit point, an inventory entry is created for each exit point. Each product unit is sensed, located, assigned a category and in turn an exit point and listed on an exit point inventory. Each exit point has its own inventory beginning with the first conveyed product unit directed thereto. This product unit is located by the number of off-loading elements between the product unit and the exit and by weight. The encoder signal has been converted to off-loading elements to accommodate the inventory.

As the first product unit assigned to a given exit progresses toward that exit, the off-loading elements between the product unit and the exist decrease. This number is reduced in the inventory until reaching zero where the product unit is off-loaded. Each succeeding product unit is listed in terms of the number of off-loading elements between the just prior product unit and itself. When the number of off-loading elements of the prior product unit reaches zero and that unit is off-loaded, the distance measured in off-loading elements between the just off-loaded unit and the next unit begins to decrease in correspondence to its distance from the exit point.

As the product units advance and are exited from the conveyor, new product units are sensed and assigned to appropriate exit points. The inventory tracks this physical situation by continually removing entries as the products are off-loaded and adding new entries to the bottom of the list. The size which is included on the inventory may be accumulated from that inventory. This is useful when products are bagged or boxed by weight. The processor may be arranged to send signals to outside equipment to signal a full bag or box or actually automatically remove same. The system may also reassign all successive product units designed for a particular exit to another exit once the first exit has reached its accumulated weight or count.

The recognition of the physical attribute of a product may result in a binary output or present specific magnitudes. In the case of a binary output, the product may be either retained or rejected at a given station through an on or off signal to an actuator employed to remove products from a conveyor. As an example, heavily blemished product units or unusually large or small product units might be automatically off-loaded from the conveying system at an appropriate off-loading station. Further processing of sensed magnitudes on the other hand might be employed, for example, in selecting from a plurality of off-loading stations to achieve a specific load at each station. Through such a scheme, the estimated weight of individual units could be calculated and units selectively off-loaded at a plurality of stations to achieve a certain bag weight at each station. The signals generated by the system typically may actuate solenoid devices which in turn actuate off-loading systems.

Thus, a mechanism is contemplated for inputting light images of product units or portions thereof in an arrangement such that the output presents a plurality of measurable magnitudes of light in specified spectra useful for distinguishing between product units. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for distinguishing between adjacent product units conveyed substantially in single file, comprising the steps of conveying product units along a conveying path;

repeatedly measuring in a thin scan area extending across the conveying path a representation of the local width of product conveyed along the conveying path past the scan area, said repeated measuring covering substantially contiguous areas of product;

comparing sequential width representations, noting increases and decreases in product widths and effectively ignoring width representations having no change greater than a threshold change over immediately prior said width representations;

distinguishing between product units when a selected plurality of decreases in width representations is followed by a selected plurality of increases in width representations.

2. The method of claim 1 wherein said selected plurality of decreases in width representations and said selected plurality of increases in width representations are equal.

3. The method of claim 1 wherein said selected plurality of decreases in width representations is satisfied by either of a first sequence of two decreases followed by one increase followed by two decreases or a second sequence of three decreases without an increase therebetween in width representations.

4. The method of claim 1 wherein said selected plurality of increases in width representations is satisfied by either of a first sequence of two increases followed by one decrease followed by two increases or a second sequence of three increases without a decrease therebetween in width representations.

5. A method for discriminating product units by physical attribute using light spectra, comprising the steps of conveying product units along a conveying path;

repeatedly measuring in a thin scan area extending across the conveying path a representation of the local width of product conveyed along the conveying path past the scan area, said repeated measuring covering substantially contiguous areas of product;

comparing sequential width representations, noting increases and decreases in product width and effectively ignoring width representations having no change greater than a threshold change over immediately prior said width representations;

distinguishing between product units when a selected plurality of decreases in width representations is followed by a selected plurality of increases in width representations;

summing the magnitude of sequential width representations;

separately storing the last three width representations measured;

subtracting the last three width representations measured from the summation of sequential width representations upon distinguishing between product units when a selected plurality of decreases in width representations are followed by a selected plurality of increases in width representations;

initiating a new summation and adding to the new summation the last three width representations measured.

6. The method of claim 5 wherein said selected plurality of decreases in width representations and said selected plurality of increases in width representations are equal.

7. The method of claim 5 wherein said selected plurality of decreases in width representations is satisfied by either of a first sequence of two decreases followed by one increase followed by two decreases or a second sequence of three decreases without an increase therebetween in width representations.

8. The method of claim 5 wherein said selected plurality of increases in width representations is satisfied by either of a first sequence of two increases followed by one decrease followed by two increases or a second sequence of three increases without a decrease therebetween in width representations.

9. A method for distinguishing between adjacent product units conveyed substantially in single file, comprising the steps of conveying product units along a conveying path;

repeatedly measuring in a thin scan area extending across the conveying path a representation of the local width of product conveyed along the conveying path past the scan area, said repeated measuring covering substantially contiguous areas of product;

testing each measurement to determine if the width representation reaches a minimum threshold level;

comparing sequential width representations, noting increases and decreases in product width;

distinguishing between product units when a selected plurality of decreases in width representations is followed by a selected plurality of increases in width representations;

comparing the number of product measurements where the width representation sequentially exceeded the minimum width threshold either upon said step of testing each measurement when said width representation fails to exceed the minimum width threshold or when said step of distinguishing between product units occurs with a minimum number of product measurements;

summing the magnitudes of sequential width representations;

resetting said summation to zero if the number of consecutive measurements does not meet the minimum number of measurements.

10. A method for distinguishing between gradable product units and other material on a conveyor, comprising the steps of conveying product units along a conveying path;

repeatedly measuring in a thin scan area extending across the conveying path a representation of the local width of product conveyed along the conveying path past the scan area, said repeated measuring covering substantially contiguous areas of product;

recording only representations of the local width above a threshold level of such representations;

accumulating the number of consecutive measurements recorded for the product unit;

ignoring the recorded representations if the total accumulated number of consecutive measurements is below a threshold level.

11. The method of claim 10 further comprising the step of accumulating the magnitude of consecutive measurements recorded for a product unit.

12. A method for distinguishing among gradable product units and between gradable product units and other material on a conveyor, comprising the steps of conveying product units along a conveying path;

repeatedly measuring a thin scan area extending across the conveying path a representation of the local width of product conveyed along the conveying path past the scan area, said repeated measuring covering substantially contiguous areas of product;

recording only representations of the local width above a threshold level of such representations;

accumulating the number of consecutive measurements recorded for the product unit;

ignoring the recorded representations if the total accumulated number of consecutive measurements is below a threshold level;

accumulating the magnitude of consecutive measurements recorded for the product unit.

13. A method for distinguishing among gradable product units and between gradable product units and other material on a conveyor, comprising the steps of conveying product units along a conveying path;

repeatedly measuring in a thin scan area extending across the conveying path a representation of the local width of product conveyed along the conveying path past the scan area, said repeated measuring covering substantially contiguous areas of product;

recording only representations of the local width above a threshold level of such representations;

accumulating the number of consecutive measurements recorded for the product unit;

ignoring the recorded representations if the total accumulated number of consecutive measurements is below a threshold level;

accumulating the magnitude of consecutive measurements recorded for the product unit;

comparing sequential width representations, noting increases and decreases in product widths and effectively ignoring widths representations having no change greater than a threshold change over immediately prior said width representations;

distinguishing between product units when a selected plurality of decreases in width representations is followed by a selected plurality of increases in width representations.

14. A method for distinguishing between readable product units, comprising the steps of conveying product units along a conveying path;

repeatedly measuring in a thin scan area extending across the conveying path a representation of the local width of product conveyed along the conveying path past the scan area, said repeated measuring covering substantially contiguous areas of product, the representation of local width of product being the magnitude of at least one light spectra measured in the scan area;

distinguishing between product units using patterns of change in representations of the local width of the product conveyed of adjacent thin scan areas;

accumulating the number of consecutive measurements for each distinguished product unit.

15. A method for distinguishing between gradable product units, comprising the steps of conveying product units along a conveying path;

repeatedly measuring in a thin scan area extending across the conveying path a representation of the local width of the product conveyed along the conveying path past the scan area, said repeated measuring covering substantially contiguous areas of product, the representation of local width of product being the magnitude of at least one light spectra measured in the scan area;

recording only representations of the local width above a threshold level of magnitude of such representations;

accumulating the number of consecutive measurements recorded for the product unit;

ignoring the recorded representations if the total accumulating number of consecutive measurements is below a threshold level.

16. The method of claim 15 further comprising the step of distinguishing between product units using patterns of change in representations of the local width of the product conveyed of adjacent thin scan areas.

* * * * *

UNITED STATES PATENT AND TRADEMARK OFFICE
CERTIFICATE OF CORRECTION

PATENT NO. : 5,018,864

DATED : May 28, 1991

INVENTOR(S) : GERALD R. RICHERT

It is certified that error appears in the above-identified patent and that said Letters Patent is hereby corrected as shown below:

In claim 12 (column 18, line 21), after "measuring" insert -- in --.

Signed and Sealed this

Twenty-third Day of February, 1993

*Attest:*

STEPHEN G. KUNIN

*Attesting Officer* *Acting Commissioner of Patents and Trademarks*